United States Patent
Komarla et al.

(10) Patent No.: US 7,174,471 B2
(45) Date of Patent: Feb. 6, 2007

(54) SYSTEM AND METHOD FOR ADJUSTING I/O PROCESSOR FREQUENCY IN RESPONSE TO DETERMINING THAT A POWER SET POINT FOR A STORAGE DEVICE HAS NOT BEEN REACHED

(75) Inventors: Eshwari P. Komarla, Karnataka (IN); Vincent J. Zimmer, Federal Way, WA (US); Devadatta V. Bodas, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 445 days.

(21) Appl. No.: 10/745,828

(22) Filed: Dec. 24, 2003

(65) Prior Publication Data

US 2005/0144486 A1 Jun. 30, 2005

(51) Int. Cl.
*G06F 1/26* (2006.01)
*G06F 1/04* (2006.01)

(52) U.S. Cl. ...................... 713/320; 713/600
(58) Field of Classification Search ................. 713/300, 713/320, 322, 323, 600
See application file for complete search history.

(56) References Cited

U.S. PATENT DOCUMENTS

| | | | | |
|---|---|---|---|---|
| 5,655,126 A | * | 8/1997 | Glenning | 713/324 |
| 5,937,433 A | | 8/1999 | Lee et al. | |
| 6,105,142 A | * | 8/2000 | Goff et al. | 713/324 |
| 6,189,106 B1 | * | 2/2001 | Anderson | 713/300 |
| 6,622,252 B1 | * | 9/2003 | Klaassen et al. | 713/320 |
| 2002/0178387 A1 | | 11/2002 | Theron | |
| 2003/0074524 A1 | | 4/2003 | Coulson | |
| 2003/0145086 A1 | | 7/2003 | O'Reilly | |

FOREIGN PATENT DOCUMENTS

EP 0 666 539 8/1995

OTHER PUBLICATIONS

Microsoft Computer Dictionary, 2002, Microsoft Press, 5th Ed., p. 275.*
American National Standards Institute (ANSI), "dpANS-SCSI Architecture Model-2 (SAM-2)", Revision 24, Sep. 12, 2002, pp. i-xi & 1-102.
Hewlett Packard Corporation, Intel Corporation, Microsoft Corporation, Phoenix Technologies Ltd. and Toshiba Corporation, "ACPI: Advanced Configuration and Power Interface", [online], Aug. 25, 2003, [Retrieved on Nov. 20, 2003], retrieved from the internet at <URL: http://www.scpi.info>.
Hewlett Packard Corporation, Intel Corporation, Microsoft Corporation, Phoenix Technologies Ltd. and Toshiba Corporation, "Advanced Configuration and Power Interface Specification", Revision 3.0, Sep. 2, 2004, pp. 1-44, 83-158, & 233-274.

(Continued)

Primary Examiner—Thomas C. Lee
Assistant Examiner—Mark Connolly
(74) Attorney, Agent, or Firm—Janaki K. Davda; Konrad Raynes & Victor LLP

(57) ABSTRACT

Provided is a technique for power and performance management of one or more storage devices. With a power and performance management agent, a power change notification identifying a power set point is received and a power state of at least one storage device is adjusted.

18 Claims, 13 Drawing Sheets

OTHER PUBLICATIONS

Information Sciences Institute, "Internet Protocol", RFC 791, Sep. 1981, pp. i-iii & 1-45.

Information Sciences Institute, "Transmission Control Protocol", RFC 793, Sep. 1981, pp. i-iii & 1-85.

Institute of Electrical and Electronics Engineers, Inc. (IEEE), "IEEE Std 802.11b-1999", *Supplement to IEEE Standard for Information Technology*, Part 11, Mar. 8, 2002, pp.i-vii & 1-10.

Institute of Electrical and Electronics Engineers, Inc. (IEEE), "IEEE Std 802.3-2002", *IEEE Standard for Information Technology*, Part 3, Mar. 8, 2002, pp. 1-32.

Krueger, M. , R. Haagens, C. Sapuntzakis, & M. Bakke, "(iSCSI) Requirements and Design Considerations", RFC 3347, Jul. 2002, pp. 1-26.

PCI Special Interest Group, "Peripheral Component Interconnect (PCI) Bus Specification Order Form", [online], © 2004 PCI-SIG, Retrieved from the Internet at <URL: http://www.pcisig.com/specifications/order_form>.

Searchstorage.com, "Definition: Fibre Channel", [online], [Retrieved on Jan. 25, 2005], Retrieved from the Internet at <URL: http://searchstorage.techtarget.com/sDefinition/0,,sid5_gci212114,00.html>.

Searchstorage.com, "Definition: RAID", [online], [Retrieved on Jan. 25, 2005], Retrieved from the Internet at <URL: http://searchstorage.techtarget.com/sDefinition/0,,sid5_gci214332,00.html>.

Serial Ata, "Serial ATA: Specs and Design Guides", [online], published Feb. 4, 2003, retrieved form the Internet at <URL: http://www.serialata.com>.

Serial Ata Workgroup, "Serial ATA: High Speed Serialized AT Attachment", Revision 1.0, Aug. 29, 2001, pp. 1-36.

Shanley, T. and D. Anderson, "PCI System Architecture", Fourth Edition, © 1999 by Mindshare, Inc., pp. i-xliii & 1-21.

Weber, R., M. Rajagopal, F. Travostino, M. O'Donnell, C. Monia, & M. Merhar, "FC Frame Encapsulation", RFC 3643, Dec. 2003, pp. 1-20.

PCT/US2004/042679 Invitation to Pay Additional Fees & Partial Search Report, Nov. 3, 2005.

PCT/US2004/042679 International Search Report & Written Opinion, Jan. 6, 2006.

International Preliminary Report on Patentability (IPRP), Jul. 6, 2006, for International Application No. PCT/US2004/042679.

\* cited by examiner

SYSTEM AND METHOD FOR ADJUSTING I/O PROCESSOR FREQUENCY IN RESPONSE TO DETERMINING THAT A POWER SET POINT FOR A STORAGE DEVICE HAS NOT BEEN REACHED

BACKGROUND

1. Field

The disclosure relates to techniques for dynamic power management.

2. Description of the Related Art

In a conventional system, a server that operates as a data center is connected to a storage subsystem. Power delivery and cooling capability in datacenters is limited. Improving this capability is technically challenging and expensive. Storage subsystems are responsible for a large portion of the power consumption and the heat load. For example, in many cases the storage subsystem includes disk drives, and power is used to keep a disk drive available for reads and writes (i.e., "awake") even when there are no existing reads and writes for the disk drive. Additionally, when disk drives are moved to a reduced power state, moving the disk drives to a higher powered state is sometimes time consuming.

Another problem in conventional systems is lowered availability in data centers due to failures in power and cooling systems. In a data center, power delivery (e.g., utility power, UPS, backup generators) and cooling systems occasionally break down. Today, many data centers are shut down while working through such failures. In order to maintain high availability, it is important that data centers continue to operate.

Conventional storage subsystems have hardly any form of power management. Typically, logic on each drive of a storage subsystem manages the local drive, which may include spinning down during periods in which the local drive is not busy. However, there is a fear in that putting the storage subsystem into a low-power state has a deleterious effect on I/O throughput, thus compromising On-Line Transaction Processing (OLTP) results.

Thus, either disk drives have power management implemented at the drive level where drives spin down when the load is less or device power states are not actively managed, so that disk subsystems are left running continuously.

Therefore, there is a need in the art for improved power management of storage subsystems.

BRIEF DESCRIPTION OF THE DRAWINGS

Referring now to the drawings in which like reference numbers represent corresponding parts throughout.

DETAILED DESCRIPTION OF THE EMBODIMENTS

In the following description, reference is made to the accompanying drawings which form a part hereof and which illustrate several embodiments of the invention. It is understood that other embodiments may be utilized and structural and operational changes may be made without departing from the scope of embodiments of the invention.

Certain embodiments of the invention provide dynamic, policy-driven power-management in a storage subsystem.

Figure 1A:
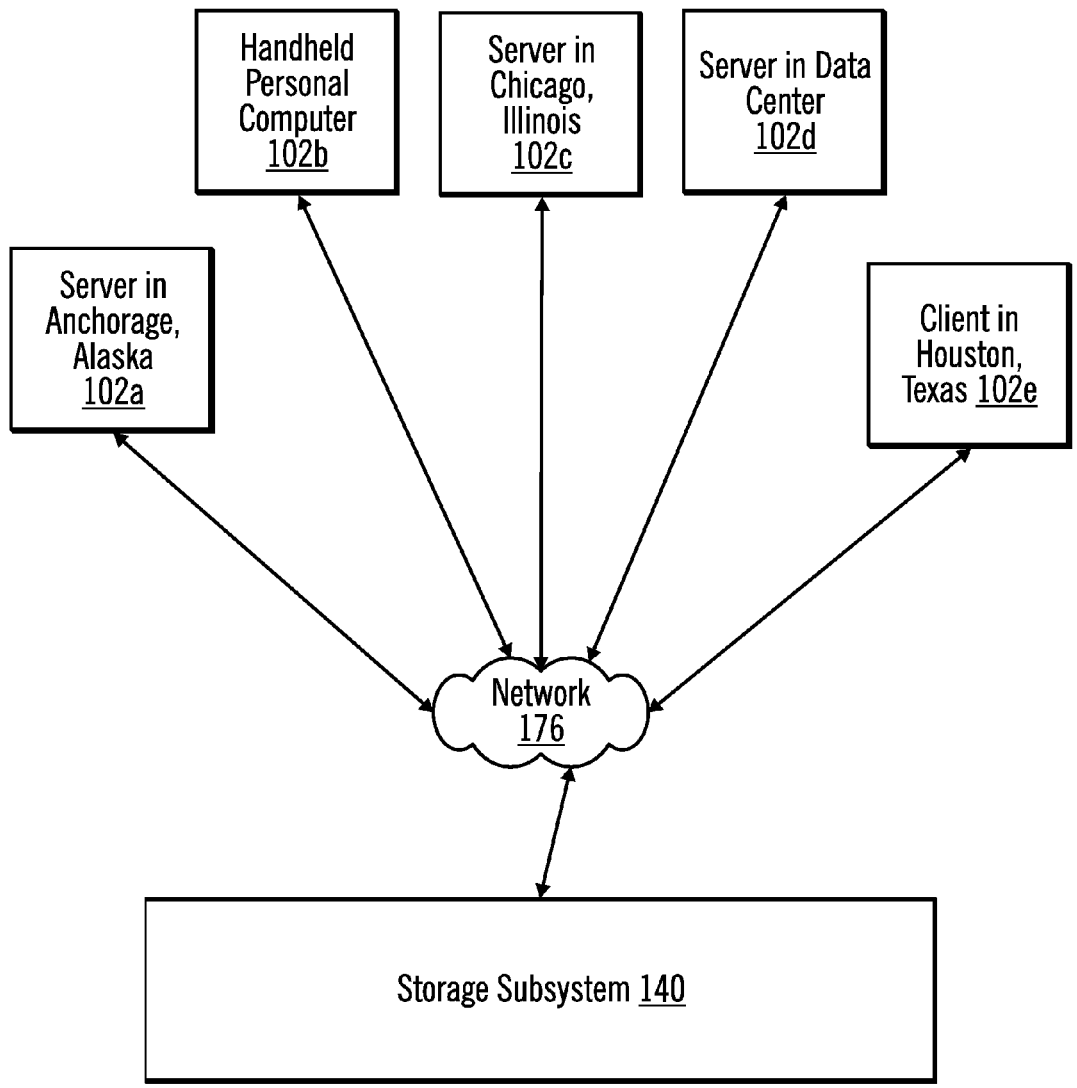
FIG. 1A illustrates a computing environment in which certain embodiments of the invention are implemented.

FIG. 1A illustrates a computing environment in which certain embodiments of the invention may be implemented. Various computing devices 102a, 102b, 102c, 102d, and 102e are connected via a network 176 to a storage subsystem 140. The computing devices may be, for example, a server in Anchorage, Ak. 102a, a handheld personal computer 102b, a server in Chicago, Ill. 102c, a server in a data center 102d, and a client in Houston, Tex. 102e. Network 176 may be, for example, a Local Area Network (LAN), the Internet, a Wide Area Network (WAN), Storage Area Network (SAN), WiFi (IEEE 802.11, 1999), Wireless LAN (IEEE 802.11, 1999), etc. That is, the storage subsystem 140 is connected to network attached client and server computing machines 102a, 102b, 102c, 102d, and 102e issuing I/O requests.

Figure 1B:
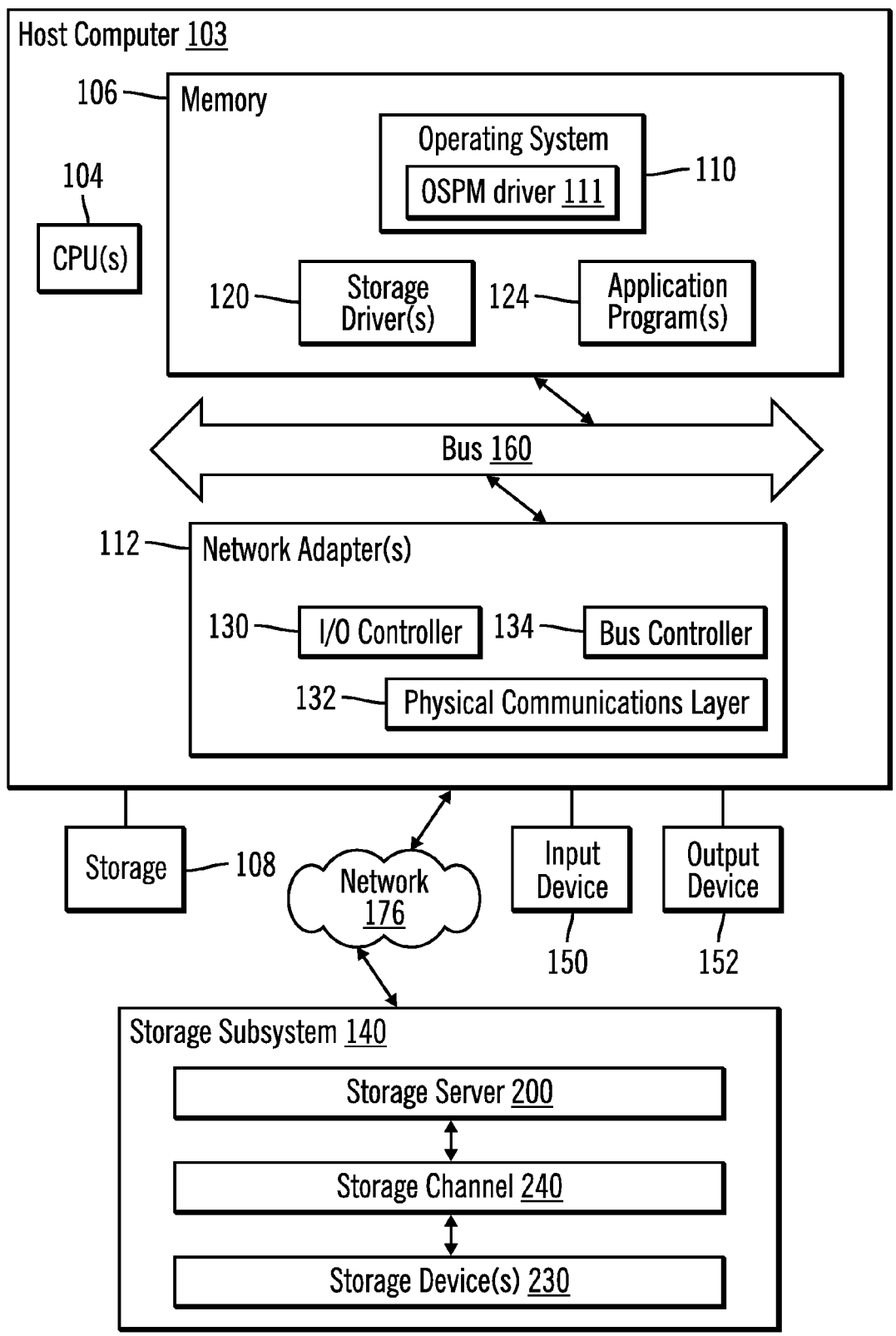
FIG. 1B illustrates further details of a computing environment in which certain embodiments of the invention may be implemented.

FIG. 1B illustrates further details of a computing environment in which certain embodiments of the invention may be implemented. A host computer 103 includes one or more central processing units (CPUs) 104, a volatile memory 106, non-volatile storage 108 (e.g., magnetic disk drives, optical disk drives, a tape drive, etc.), an operating system 110, and one or more network adapters 128. The operating system 110 may include operating system drivers, such as an Operating System Power Management (OSPM) driver 111. One or more storage drivers 120 and one or more application programs 124 further execute in memory 106 and are capable of transmitting and retrieving packets from remote storage subsystem 140 over the network 176.

The host computer 10e may comprise any computing device known in the art, such as a mainframe, server, personal computer, workstation, laptop, handheld computer, telephony device, network appliance, virtualization device, storage controller, etc. Computing devices 102a, 102b, 102c, 102d, and/or 102e may implement the system of host computer 104. Any CPU 104 and operating system 110 known in the art may be used. Programs and data in memory 106 may be swapped into storage 108 as part of memory management operations.

The storage subsystem 140 includes a storage server 200 (i.e., a type of computing device) connected to a storage channel 240, which is connected to one or more storage devices 230 (e.g., disk drives that are part of a Redundant Array of Independent Disks (RAID) system). Storage devices 230 may also be referred to as an I/O subsystem 230.

Each network adapter 128 includes various components implemented in the hardware of the network adapter 112. Each network adapter 112 is capable of transmitting and receiving packets of data over network 176.

Each storage driver 120 executes in memory 106 and includes network adapter 112 specific commands to communicate with each network adapter 112 and interface between the operating system 110 and each network adapter 112. Each network adapter 112 or storage driver 120 implements logic to process the packets, such as a transport protocol layer to process the content of messages included in the packets that are wrapped in a transport layer, such as Transmission Control Protocol (TCP) and/or Internet Protocol (IP) (Transmission Control Protocol DARPA Internet Program Protocol Specification, September 1981; Internet Engineering Task Force (IETF) Internet Protocol Version 4(IPV4)), the Internet Small Computer System Interface (iSCSI) (IETF February 2003), Fibre Channel (ISO 14165-1), or any other transport layer protocol known in the art. The transport protocol layer unpacks the payload from the received TCP/IP packet and transfer the data to a storage driver 120 to return to the application program 124. Further, an application program 124 transmitting data transmits the data to a storage driver 120, which then sends the data to the transport protocol layer to package in a TCP/IP packet before transmitting over the network 176.

A bus controller 134 enables each network adapter 112 to communicate on a computer bus 160, which may comprise any bus interface known in the art, such as a Peripheral Component Interconnect (PCI) bus, Small Computer System Interface (SCSI), Serial ATA, etc. The network adapter 112 includes a network protocol for implementing a physical communication layer 132 to send and receive network packets to and from remote data storages over a network 176. In certain embodiments, the network adapter 112 may implement the Ethernet protocol (IEEE std. 802.3, published Mar. 8, 2002), Fibre Channel (ISO 14165-1), or any other network communication protocol known in the art.

The network adapter 112 includes an Input/Output (I/O) controller 130. In certain embodiments, the I/O controller 130 may comprise Internet Small Computer System Interface (iSCSI controllers), and it is understood that other types of network controllers, such as an Ethernet Media Access Controller (MAC) or Network Interface Controller (NIC), or cards may be used.

The storage 108 may comprise an internal storage device or an attached or network accessible storage. Programs in the storage 108 are loaded into the memory 106 and executed by the CPU 104. An input device 150 is used to provide user input to the CPU 104, and may include a keyboard, mouse, pen-stylus, microphone, touch sensitive display screen, or any other activation or input mechanism known in the art. An output device 152 is capable of rendering information transferred from the CPU 104, or other component, such as a display monitor, printer, storage, etc.

In certain embodiments, in addition to one or more storage drivers 120, the host computer 103 may include other drivers, such as a transport protocol driver (not shown) that performs the functions of the transport protocol layer.

The network adapter 112 may include additional hardware logic to perform additional operations to process received packets from the computer 103 or the network 176. Further, the network adapter 112 may implement a transport layer offload engine (TOE) to implement the transport protocol layer in the network adapter as opposed to the computer storage driver 120 to further reduce host computer processing burdens. Alternatively, the transport layer may be implemented in the storage driver 120.

Various structures and/or buffers (not shown) may reside in memory 106 or may be located in a storage unit separate from the memory 106 in certain embodiments.

Figure 2A:
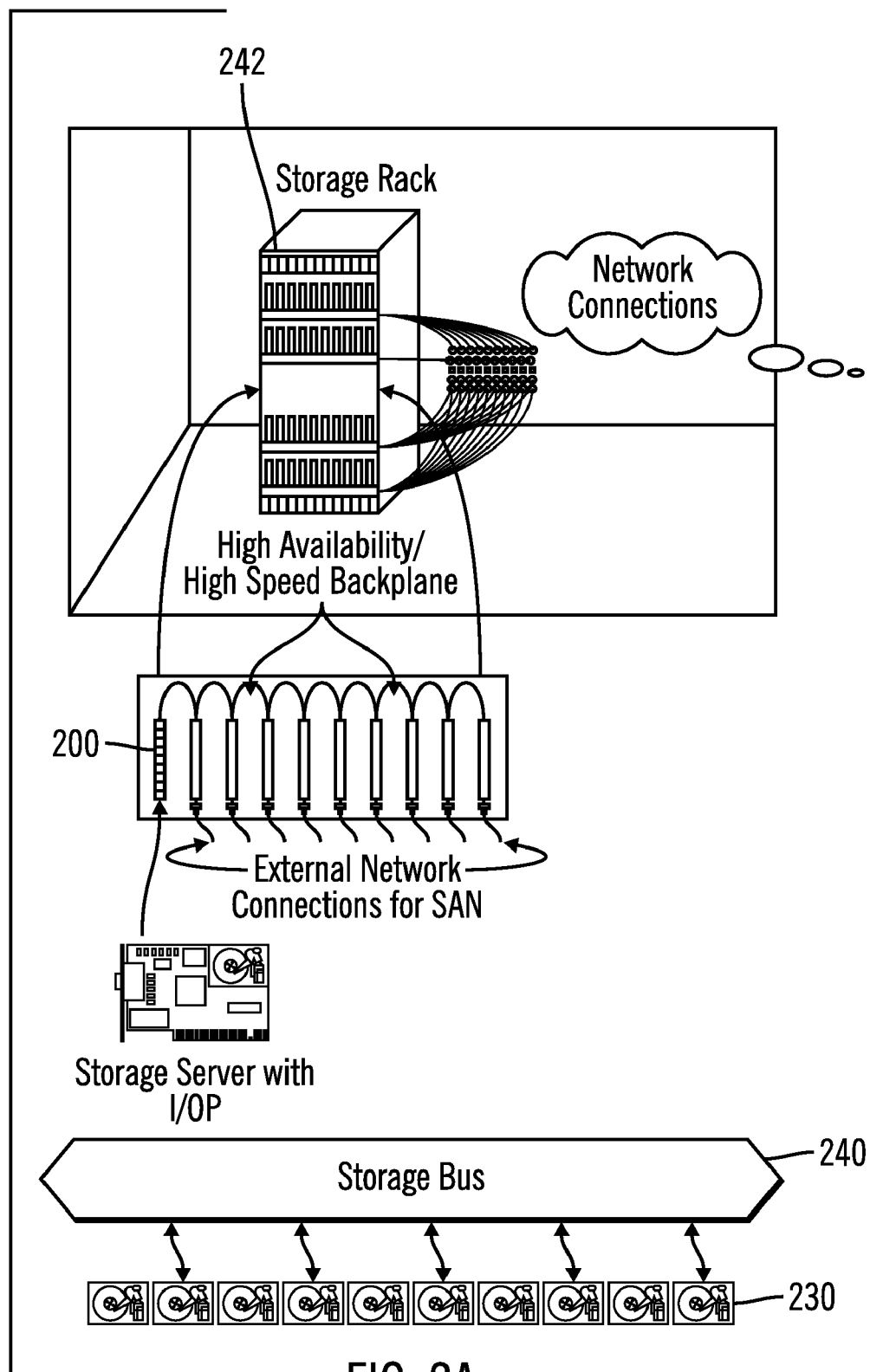
FIG. 2A illustrates a storage rack in accordance with certain embodiments of the invention.

FIG. 2A illustrates a storage rack 242 in accordance with certain embodiments of the invention. The storage rack 242 includes a high availability, high speed backplane for external network connections for servers on a Storage Area Network (SAN). One of the servers is a storage server 200 with an I/O processor that is connected to a storage bus (i.e., a type of storage connection 240), which is connected to storage devices 230. FIG. 2A provides an example of an enterprise storage topology with network-attached storage to demonstrate how certain embodiments of the invention may be extended into an enterprise power management domain that spans Storage Area Networks (SAN's) and storage servers with I/O processors.

Figure 2B:
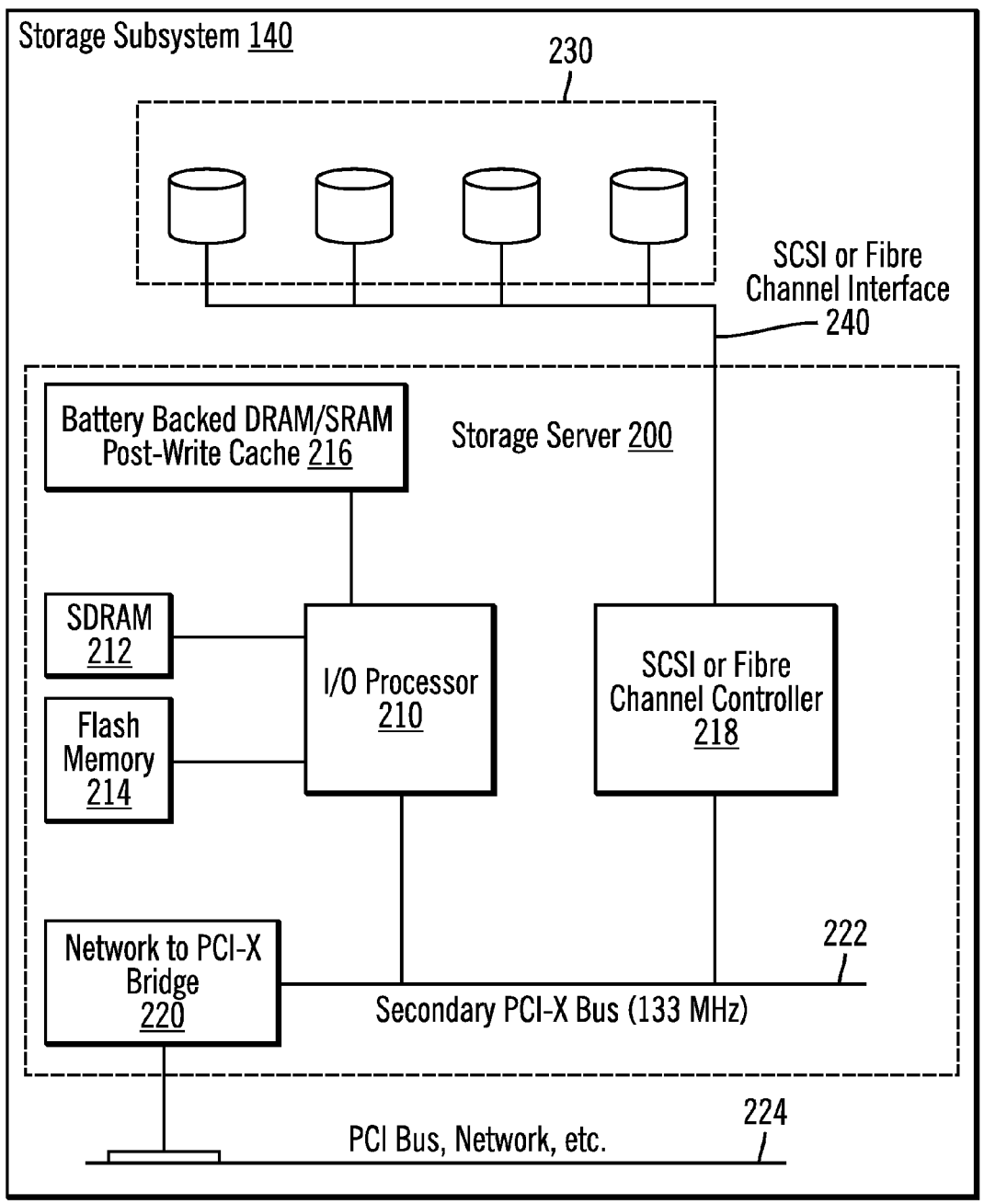
FIG. 2B illustrates further details of a storage subsystem in accordance with certain embodiments of the invention.

FIG. 2B illustrates further details of a storage subsystem 140 in accordance with certain embodiments of the invention. The storage subsystem 140 includes storage server 200, a Small Computer Systems Interface (SCSI) or Fibre channel interface (i.e., types of communication paths 240), and storage devices 230. The storage server 200 includes an I/O processor 210. In certain embodiments, the invention is implemented in an Intel® XScale™ I/O processor available from Intel Corporation. In certain embodiments, the I/O subsystem 230 is controlled by the I/O processor 210. In certain embodiments, the storage devices 230 may be described as a NAS unit. In certain embodiments, the I/O processor 210 may be resident on a motherboard of the storage server 200 or is part of a chipset. The I/O processor 210 is an intelligent processor with an operating environment specialized for storage (e.g., the I/O processor 210 includes firmware/software for applications such as RAID and iSCSI systems). The I/O processor 210 manages data transfer from the storage devices 130 to the host computer 103 CPU 140 and vice-versa.

The storage server 200 also includes Synchronous Dynamic Random Access Memory (SDRAM) 212 and Flash memory 214 for use by the I/O processor 210. A section of memory (cache 216) managed by the I/O processor 210 is battery-backed, thus allowing for use as a post-write cache (i.e., for storing write transactions and acting as a buffer cache). Cache 216 may be, for example, Dynamic Random Access Memory (DRAM) or Static Random Access Memory (SRAM). A SCSI or Fibre channel controller 218 is used to connect to SCSI or Fibre channel interface 240. In certain embodiments, Integrated Drive Electronics (IDE) may be used instead of or in addition to channel controller 218. Also, a network to PCI-X bridge 220 is connected to the I/O processor 210 and channel controller 218 via a secondary PCI-X bus 222 (e.g., of 133 MHz) and is connected to a PCI bus, a network, host computer 103, etc. via communication path 224.

Figure 2C:
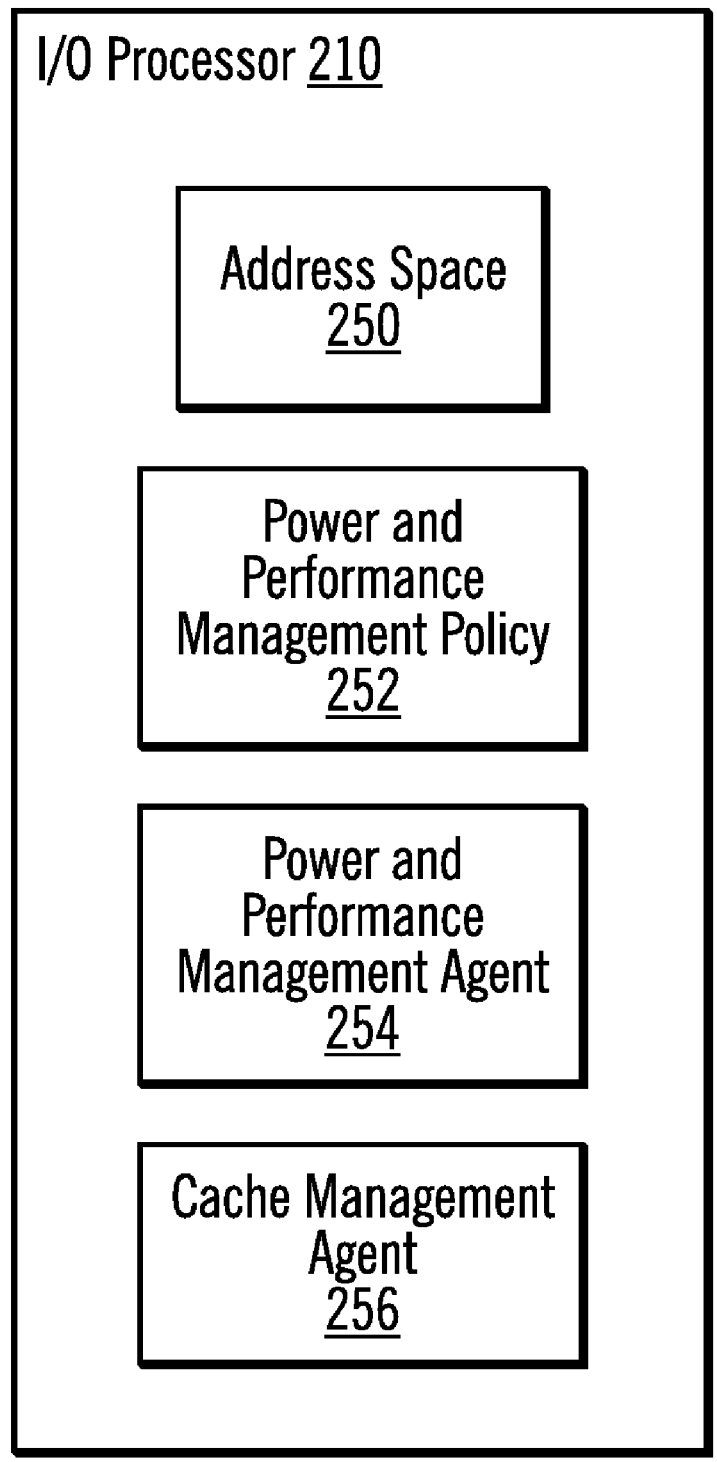
FIG. 2C illustrates further details of an I/O processor in accordance with certain embodiments of the invention.

FIG. 2C illustrates further details of an I/O processor 210 in accordance with certain embodiments of the invention. The I/O processor 210 includes address space 250 and power and performance management policy 252. The I/O processor 210 also includes (e.g., either in a software stack or as firmware) power and performance management agent 254 to perform power management tasks (in addition to other I/O software, not shown). The I/O processor 210 also includes a cache management agent 256 to assist with managing the cache 216.

Figure 2D:
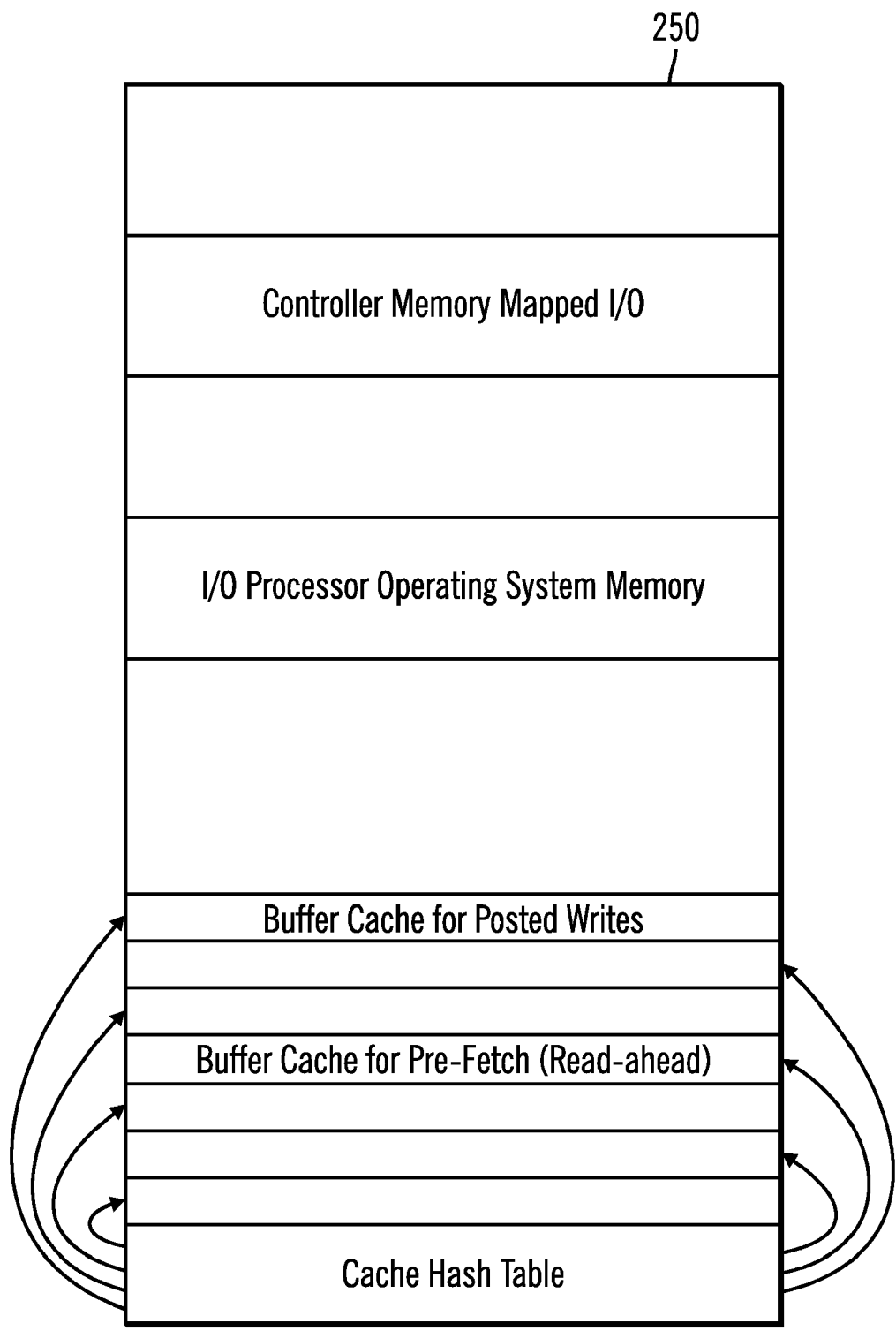
FIG. 2D illustrates further details of an address space usage for the I/O processor in accordance with certain embodiments of the invention.

FIG. 2D illustrates further details of an address space 250 usage for the I/O processor 210 in accordance with certain embodiments of the invention. The address space 250 includes controller memory mapped I/O for use by the channel controller 218, I/O processor operating system memory for use by the I/O processor 210, a buffer cache for posted writes for use by cache 216, a buffer cache for pre-fetch (i.e., for read-ahead), and a cache hash table.

Certain embodiments of the invention leverage the computational capabilities of the I/O processor 210 to manage storage devices 230 in order to track a power and/or performance set point that is consistent with a host computer 103. In certain embodiments, power refers to energy being used, while performance may refer to limiting latency, etc.

Figure 3:
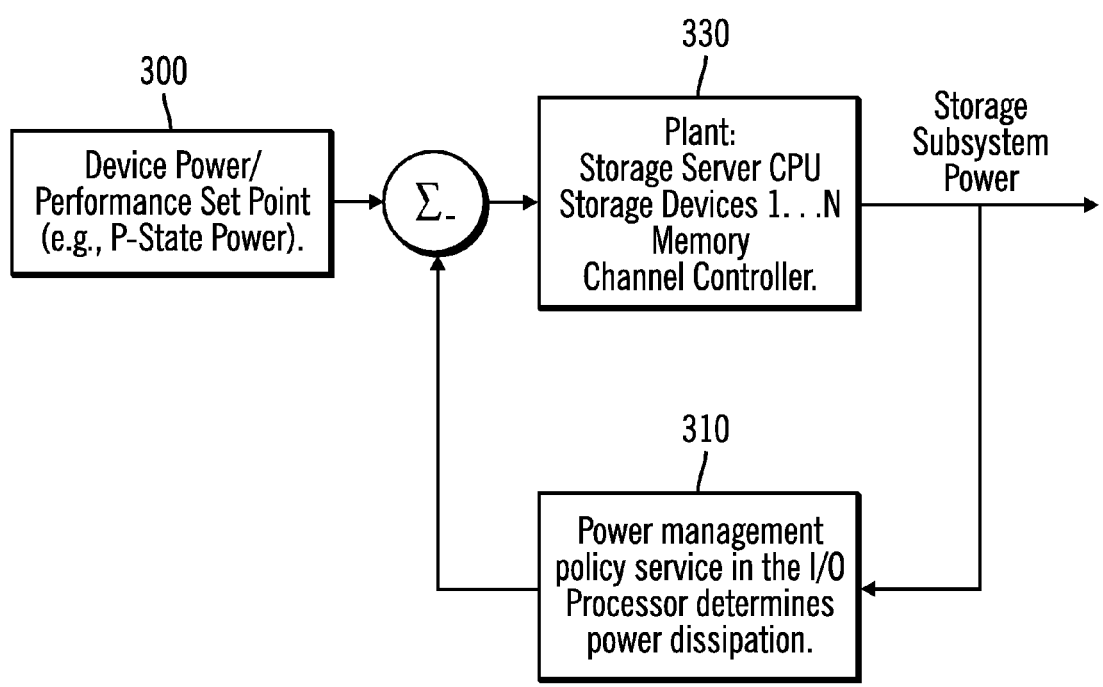
FIG. 3 illustrates a general power-management flow in accordance with certain embodiments of the invention.

FIG. 3 illustrates a general power management flow in accordance with certain embodiments of the invention. This power management flow represents a technique that is managed by the power and performance management agent 254 executing upon the I/O processor 210. In FIG. 3, block 300 represents a power and/or performance set point from a host computer 103 operating system 110 (e.g., a Windows® 2003 operating system running on a Xeon™ processor) that is input to the I/O processor 210. Block 310 represents a fine-grained, performance/job-driven power management policy in the I/O processor 210. The power management policy is used to map the power and/or performance set point to a power dissipation level. Then, the I/O processor 210 attempts to adjust the power and/or performance of the components in block 330 (e.g., a storage server CPU, storage devices 1 . . . N 130, memory, and a channel controller 218) based on the power dissipation level. The result is that the I/O processor outputs a storage subsystem power. Thus, in certain embodiments, the I/O processor firmware 262 attempts to reach the set point via power-management of the storage devices 230 and I/O processor 210 components. This management may include, for example, spinning down drives, putting drives in various sleep-modes, and using the posted-write cache 216 to hide the latency that is entailed in restarting a drive from one of these reduced-power modes of operation.

In certain embodiments, an Advanced Configuration and Power Interface (ACPI) performance state ("P-state") is used as a set-point directive to the I/O processor 210. ACPI is an industry based standard for system configuration and power-management in computer systems (e.g., on laptops, desktops, and servers). ACPI abstracts system resource configuration and power-management such that the underlying hardware and system manipulations are opaque to operating systems and device drivers. ACPI defines a namespace, which is a tree structure of all system entities. Each system component is an element of this namespace (e.g., a node in the namespace). In addition to attributes, node elements may have methods that are executables coded in ACPI Machine Language (AML) to manipulate the component operation.

ACPI specifies several power states in a computer system, denoted by Sx for system power states, Cx for CPU power states, and Dx for storage device power states. In addition, ACPI defines performance states, Px, for processors and other components.

A device has the highest level of performance capability in P-state P0. Similarly, it is likely that a device may consume a highest amount of power in P-state P0. Lower performance and, thus, reduced power consumption is associated with the other P-states (i.e., P-states P1 . . . P15). An operating system 110 at the host computer 103 controls the triggering mechanism to transition to different performance and/or power states. However, the underlying hardware interfaces and interactions are abstracted via ACPI methods provided by the hardware or device vendor.

Depending on the operating system 110 and platform policy of the operating system 110, if workload for a device is not heavy, the operating system 110 may transition a storage device to a lower performance/power state, say from P0 to P1, in order to reduce the system power consumption. In certain embodiments, the trigger for transitioning between system power states may be existing workload or per user/administrator directive.

Figure 4A:
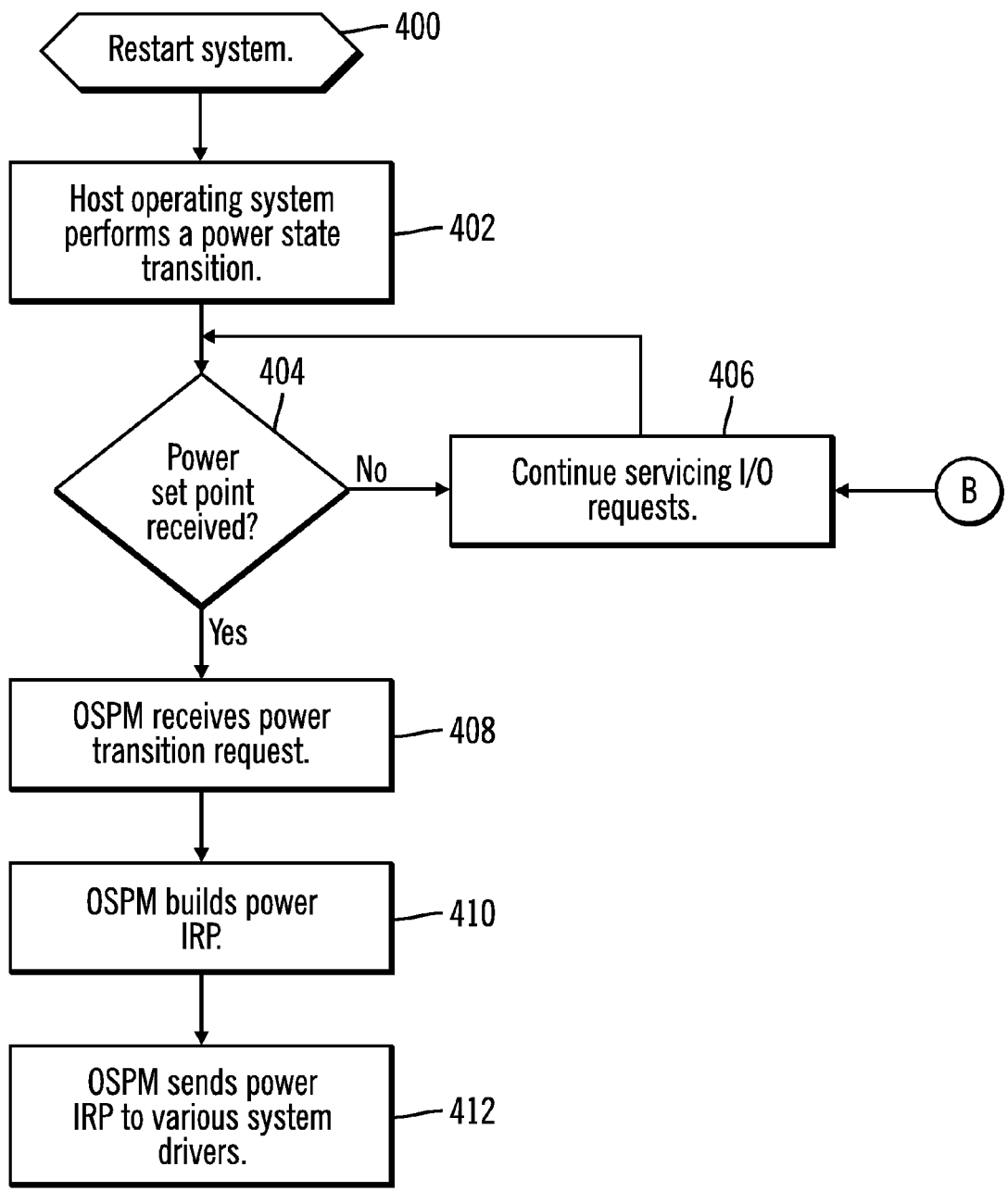
FIG. 4A illustrates operations for power management at a host computer in accordance with certain embodiments of the invention.

FIG. 4A illustrates operations for power management at a host computer 103 in accordance with certain embodiments of the invention. Control begins at block 400 with a system (e.g., host computer 103) being restarted. In block 402, the host computer 103 operating system performs a power state transition. In block 404, the I/O processor 210 determines whether a power set point (e.g., a power management P-state) has been received. In certain embodiments, the trigger for a power and/or performance state change is a directive from the host computer 103 operating system 110 based on, for example, system workload or a response to user/administrator input.

If a power set point has been received, processing continues to block 408, otherwise, processing continues to block 406. In block 406, the I/O processor 210 continues to service I/O requests. In block 408, the Operating System directed Power Management (OSPM) driver 111 receives a power transition request. In block 410, the OSPM driver 111 builds an I/O request packet (IRP) that is used to convey I/O operations from one agent to another within the operating system 110. In block 412, the OSPM driver 111 sends a power IRP (i.e., a type of power request) to various system drivers, including storage driver 120.

Figure 4B:
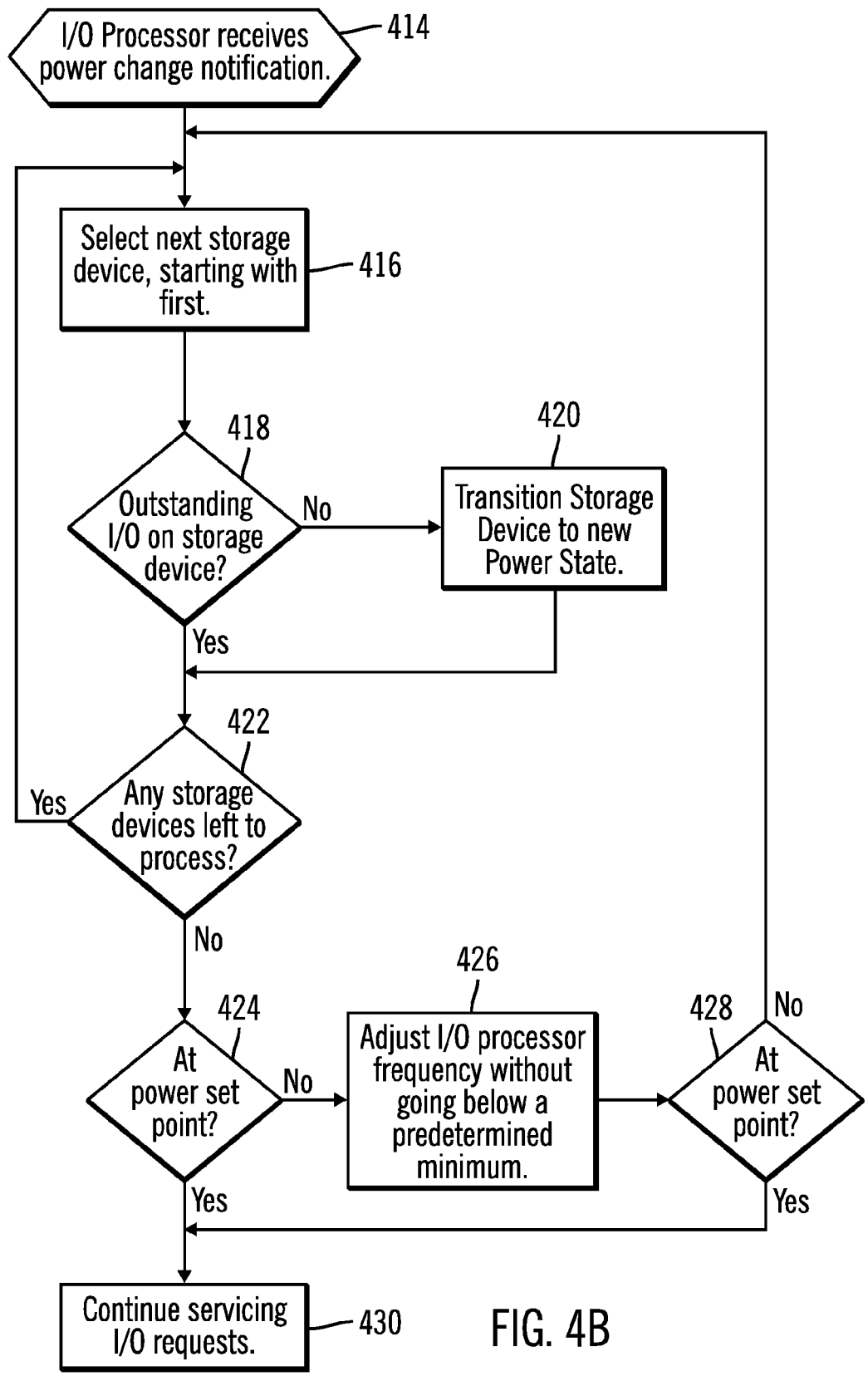
FIG. 4B illustrates operations for power management at an I/O processor in accordance with certain embodiments of the invention.

FIG. 4B illustrates operations for power management at I/O processor 210 in accordance with certain embodiments of the invention. In block 414, control begins with power and performance management agent 254 at the I/O processor 210 receiving a power change notification (e.g., a power change packet built by the storage driver 120, which received the IRP from the OSPM driver 111). In block 416, the power and performance management agent 254 at the I/O processor 210 selects the next storage device, starting with the first. In block 418, the power and performance management agent 254 at the I/O processor 210 determines whether there is any outstanding I/O on the selected storage device. If so, processing continues to block 422, otherwise, processing continues to block 420.

In block 420, the power and performance management agent 254 at the I/O processor 210 performs a power state transition for the selected storage device. In certain embodiments, the determination of which state to transition to is made using the power and performance management policy 252. A power and performance management policy 252 may be directed to, for example, lazy mirroring, and sleeping reads. The power and performance management policy 252 directed to lazy mirroring may include, for example, the following directives: 1) power down mirror disks for RAID 1 and power them up to synchronize after 500 I/O transactions; and 2) send writes that are directed to powered-down disks to non-volatile cache until non-volatile cache is full, then wake up one disk and flush writes for that disk from non-volatile cache to that disk. The power and performance management policy 252 directed to sleeping reads may include, for example, the following directive: service all reads from awake disks and a read-cache for sleeping/ powered-down disks and wake a disk that is a cache miss after 10 pending read misses.

In certain embodiments, if some storage devices are not in use, they may be shut down. In certain embodiments, each storage device not in use may be moved to a lower power state, without being shut down. In block 422, the power and performance management agent 254 at the I/O processor 210 determines whether there are any storage devices left to process. If so, processing continues to block 416, otherwise, processing continues to block 424. Thus, in certain embodiments, if there is outstanding I/O on a storage device, the power and performance management agent 254 at the I/O processor 210 does not perform power state transition for that storage device. In block 424, the power and performance management agent 254 at the I/O processor 210 determines whether the power set point has been reached. In certain embodiments, a sensor (e.g., an analog to digital converter) is available to measure power dissipation of the I/O processor 210 and the storage devices 230, and this measurement is used to determine whether the power set point has been reached. If the power set point has been reached, processing continues to block 430, otherwise, processing continues to block 426. In block 426, the power and performance management agent 254 at the I/O processor 210 frequency is adjusted without going below a predetermined minimum. The I/O processor 210 frequency is not adjusted to a predetermined minimum to avoid slowing the I/O processor 210 so much that performance is impacted. In block 428, the power and performance management agent 254 at the I/O processor 210 determines whether the power set point has been reached. If so, processing continues to block 430, otherwise, processing loops back to block 416. Thus, in certain embodiments, if performing power state transitions on the storage devices does not lead to reaching the power set point, the power and performance management agent 254 at the I/O processor 210 adjusts I/O processor frequency in an attempt to reach the power set point, and, if the power set point is not reached after this adjustment, power state transitions may be performed on the storage devices again. In block 430, the I/O processor 210 continues servicing I/O requests.

In addition, certain embodiments of the invention allow for battery-backed posted-write caching to be used in order to keep some of the mirror and/or parity disks of RAID powered-down, and then the mirror or parity updates occur when the Least-Recently Used (LRU) caching technique of the I/O processor 210 dictates an eviction from cache 216, thus allowing the mirror or parity disks to sleep in the interim without any deleterious effect on performance.

Figure 5A:
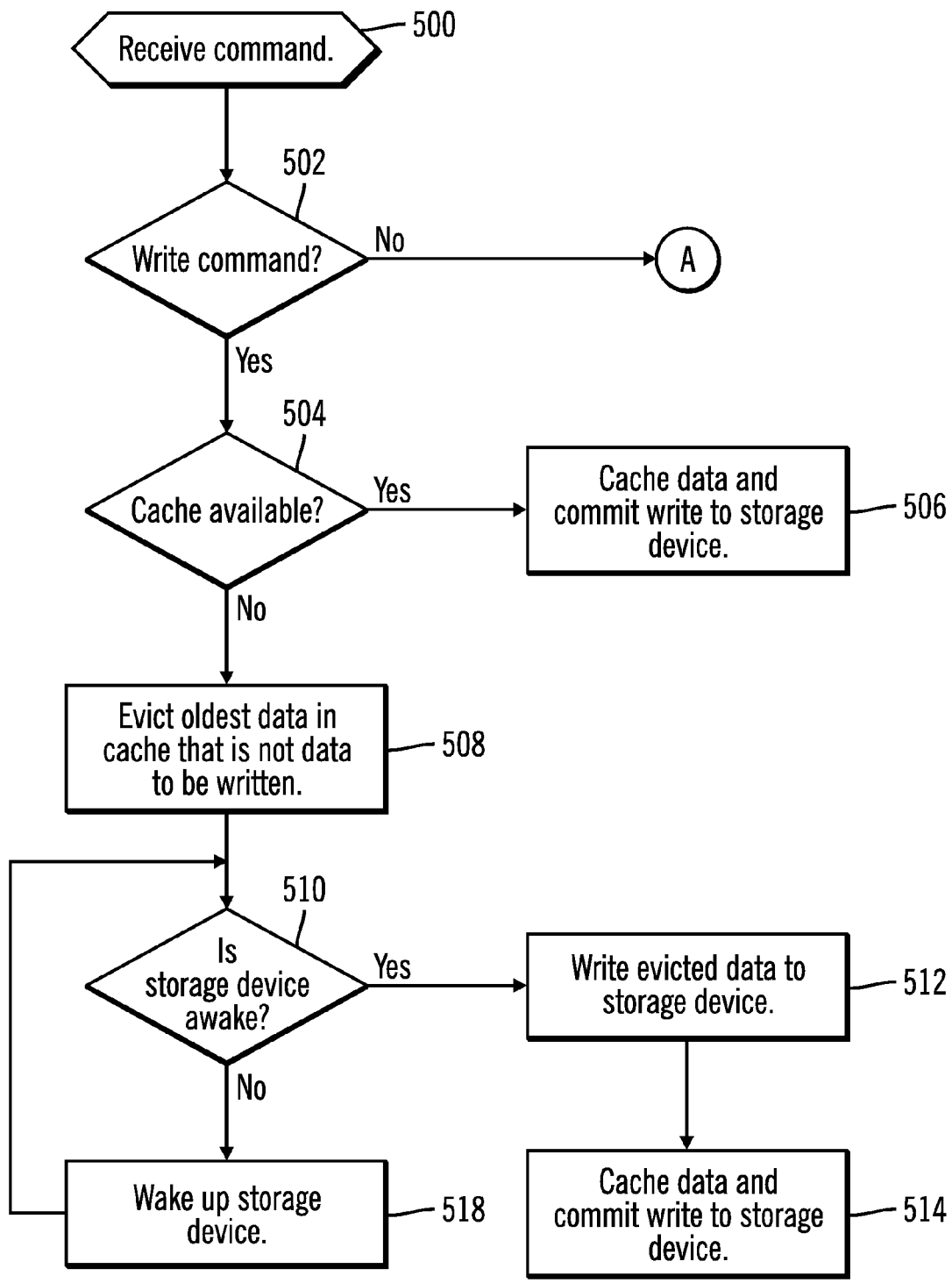
FIGS. 5A and 5B illustrate operations for the lazy updates in accordance with certain embodiments of the invention.
Figure 5B:
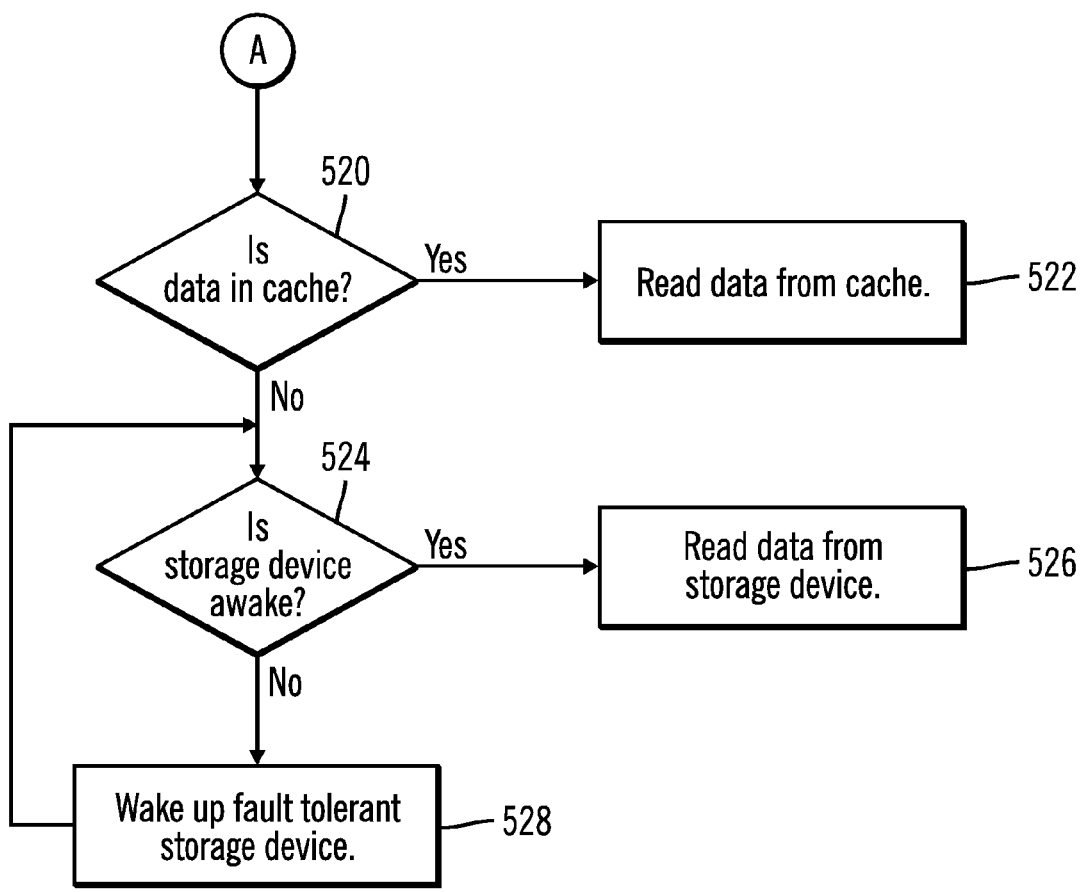

FIGS. 5A and 5B illustrate operations for the lazy updates in accordance with certain embodiments of the invention. Control begins at block 500 with receipt of a command (e.g., from host computer 103) at the I/O processor 210. In block 502, the cache management agent 256 at the I/O processor 210 determines whether the received command is a write command. If so, processing continues to block 504, otherwise, processing continues to block 520. In block 504, the cache management agent 256 at the I/O processor 210 determines whether cache 216 is available for writing data. If so, processing continues to block 506, otherwise, processing continues to block 508.

In block 506, the cache management agent 256 at the I/O processor 210 caches the data in cache 216 and commits the write to the storage device. Because the write is committed before the data is actually written to the storage device, the host computer 103 is not aware of the latency in the data actually being written to the storage device.

In block 508, if the cache 216 is not available for writing data (i.e., does not have space to store more data), the oldest data (e.g., a block of data) is evicted from cache 216 that is not data to be written. In block 510, the cache management agent 256 at the I/O processor 210 determines whether the storage device to which the oldest data is to be evicted is awake. If so, processing continues to block 512, otherwise, processing continues to block 518.

In block 512, the evicted data is written to the storage device. In block 514, the data to be written to cache 216 is written to cache 216 and the write is committed to the storage device. In block 518, the cache management agent 256 at the I/O processor 210 wakes up the storage device and loops back to block 510. In certain embodiments, the storage device is a fault tolerant storage device.

In block 520 (FIG. 5B), since the received command is not a write command, the cache management agent 256 at the I/O processor 210 recognizes that the received command is a read command, and the cache management agent 256 at the I/O processor 210 determines whether data to be read is in cache 216. If so, processing continues to block 522, otherwise, processing continues to block 524. In block 522, the cache management agent 256 at the I/O processor 210 reads data from cache 216. In block 524, the cache management agent 256 at the I/O processor 210 determines whether the storage device from which data is to be read is awake. If so, processing continues to block 526, otherwise, processing continues to block 528. In block 526, the cache management agent 256 at the I/O processor 210 reads data from the storage device. In block 528, the cache management agent 256 at the I/O processor 210 wakes up the storage device and loops back to block 524.

Figure 6:
FIG. 6 illustrates a table of power dissipation of disk drives in accordance with certain embodiments of the invention.

FIG. 6 illustrates a table 600 of power dissipation of disk drives in accordance with certain embodiments of the invention. Table 600 lists different states of a drive, such as start-up, random read/write (R/W) operation, seek, idle, standby, and sleep. Table 600 also lists different voltages for the different states and lists power consumption at each state.

Thus, certain embodiments of the invention enable adjusting power and/or performance states of storage devices 130 with an I/O processor 210 based solution that allows continuous operation of a storage subsystem 140 with lowered power and performance.

Certain embodiments of the invention extend I/O processor 210 functionality to include device performance and power management. The control point for changing state is a host computer 103 operating system 110 directive to change system state. The I/O processor 210 knows data patterns and activity levels of storage devices (e.g., disk drives) and adjusts power states of, for example, hard drives and other storage devices, in the I/O subsystem 230 accordingly. Storage devices 230 (e.g., disk drives) may be in one of several different power-states dependent on the storage device activity.

The I/O processor 210 maintains a greater control over performance and/or power management of the I/O subsystem 230 by monitoring and manipulating storage device power states, thus, freeing up the host computer 103 operating system 110 for other processing.

Certain embodiments of the invention allow for power-savings without compromising throughput. By using an ACPI P-state and having an OSPM 111 with an integral binding to the storage subsystem 140, certain embodiments of the invention overcome the problems of conventional storage subsystems that are not power-managed because servers do not support ACPI power management and there is not an integral binding between the OSPM 111 and that of the subsystem.

Certain embodiments of the invention provide power-performance with industry-leading power dissipation levels in RAID On Motherboard (ROMB) and Network-Attached Storage (NAS) deployments.

Certain embodiments of the invention introduce two power domains—one at the host computer 103 CPU 104 level and one at the I/O subsystem 230 level. The I/O processor 210 manages the I/O subsystem 230 power domain. When the host computer 103 CPU 104 directs the I/O processor 210 to change to a lower power state, the I/O processor 210 manages the I/O subsystem 230 with knowledge of I/O topologies, device traffic patterns, etc.

Certain embodiments of the invention optimize for availability and up-time, rather than performing power-management. In conventional systems, the metric against which products are measured is I/O's/second (i.e., throughput), not I/O's/WATT (i.e., power efficiency). Certain embodiments of the invention allow for such metrics as I/O's/WATT to be used.

Certain embodiments of the invention allow for lowest power-consumption without compromising I/O performance, resulting in denser hardware configurations (e.g., denser blade and rack servers). Also, the power-dissipation per cubic-meter may be used in data center deployments.

I/O processor has significant computational capabilities, learning algorithms can be used so that the I/O processor can re-enable or power-down components in anticipation of either future work or future idleness, respectively. This type of predictive capability is in the spirit of the self-managed, self-healing, autonomic systems needed for today's data center.

The I/O processor 210 may employ power-aware fault-tolerant protocols, such as RAID updates, where the writes to a "sleeping" storage device 130 may be posted to the cache and 216 and locked therein in lieu of immediate posting of the transaction to the storage device 130.

Certain embodiments of the invention leverage available platform power-management technology with novel control-theoretic techniques managed by an Intel® XScale® CPU-based subsystem. Moreover, certain embodiments of the invention allow for green-data centers by providing power management.

In certain embodiments of the invention, the I/O processor 210 complements in-platform technologies, such as ACPI, and data-center/rack-level policies. In certain embodiments, the I/O processor 210 based storage subsystem 140 implements power aware computing by implementing ACPI performance states.

Additionally, certain embodiments of the invention provide a level of power consumption and the ability to support power and thermal manageability, which is useful in decisions to purchase equipment data centers.

Intel, XScale and Xeon are registered trademarks and/or common law marks of Intel Corporation in the United States and/or foreign countries. Windows is a registered trademark and/or common law mark of Microsoft Corporation in the United States and/or foreign countries.

Additional Embodiment Details

The described techniques for dynamic power management may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art recognize that many modifications may be made to this configuration without departing from the scope of embodiments of the invention, and that the article of manufacture may comprise any information bearing medium known in the art.

The illustrated logic of FIGS. 4A, 4B, 5A, and 5B show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

Figure 7:
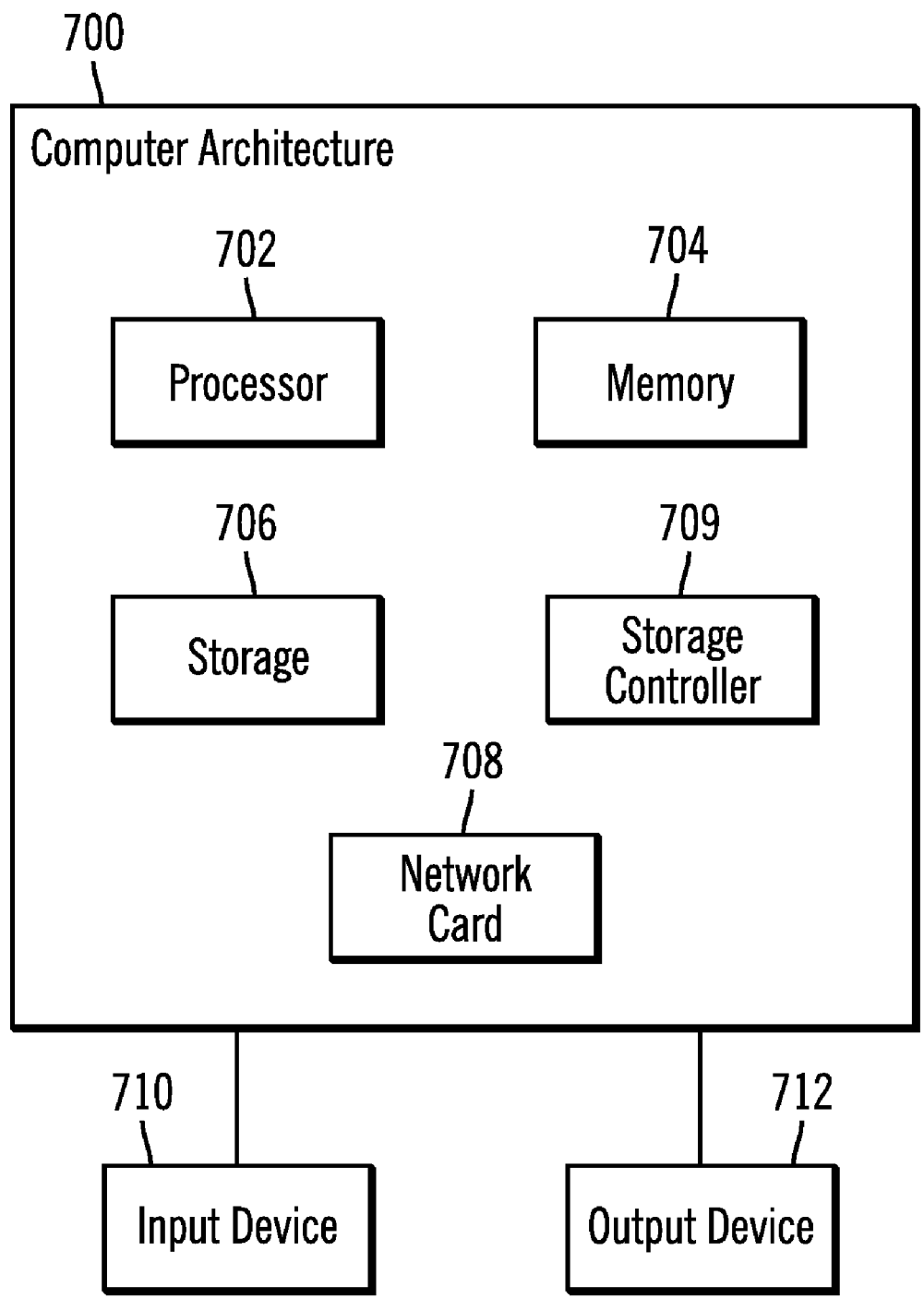
FIG. 7 illustrates one embodiment of a computer system.

FIG. 7 illustrates one embodiment of a computer system 700, such as for computing devices 102*a*, 102*b*, 102*c*, 102*d*, 102*d*, 103, and/or 200. The system 700 may include a processor 702 (e.g., a microprocessor), a memory 704 (e.g., a volatile memory device), and storage 706 (e.g., a non-volatile storage, such as magnetic disk drives, optical disk drives, a tape drive, etc.). The storage 706 may comprise an internal storage device or an attached or network accessible storage. Programs in the storage 706 are loaded into the memory 704 and executed by the processor 702 in a manner known in the art. The system further includes a network card 708 to enable communication with a network, such as an Ethernet, a Fibre Channel Arbitrated Loop, etc. Further, the system may, in certain embodiments, include a storage controller 709. As discussed, certain of the network devices may have multiple network cards. An input device 710 is used to provide user input to the processor 702, and may include a keyboard, mouse, pen-stylus, microphone, touch sensitive display screen, or any other activation or input mechanism known in the art. An output device 712 is capable of rendering information transmitted from the processor 702, or other component, such as a display monitor, printer, storage, etc.

The foregoing description of various embodiments of the invention has been presented for the purposes of illustration and description. It is not intended to be exhaustive or to limit the embodiments of the invention to the precise forms disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments of the invention. Since many embodiments of the invention can be made without departing from the spirit and scope of the embodiments of the invention, the embodiments of the invention reside in the claims hereinafter appended.

What is claimed is:

1. A method for power and performance management of one or more storage devices, comprising:
    receiving, with a power and performance management agent, a power change notification identifying a power set point;
    adjusting, with the power and performance management agent, a power state of at least one storage device;
    determining, with the power and performance management agent, whether the power set point has been reached; and
    adjusting, with the power and performance management agent, I/O processor frequency in response to determining that the power set point has not been reached.

2. The method of claim 1, wherein the power change notification is generated by a storage driver upon receipt of a power request from a host computer operating system.

3. The method of claim 1, wherein the power state is adjusted for the at least one storage device in response to determining, with the power and performance management agent, that the storage device does not have outstanding Input/Output (I/O) activity.

4. The method of claim 1, wherein the power state is adjusted based on a power and performance policy.

5. The method of claim 1, wherein the frequency is not adjusted below a predetermined minimum.

6. The method of claim 1, further comprising:
    adjusting, with the power and performance management agent, a power state of at least one additional storage device.

7. A system in communication with data storage, comprising:
    a computing device with an Input/Output (I/O) processor;
    a storage controller capable of managing Input/Output (I/O) access to the data storage, wherein the data storage controller is coupled to the computing device; and
    a power and performance management agent at the computing device capable of receiving a power change notification identifying a power set point and adjusting a power state of at least one storage device and is capable of determining whether the power set point has been reached and adjusting I/O processor frequency in response to determining that the power set point has not been reached.

8. The system of claim 7, wherein the power change notification is generated by a storage driver upon receipt of a power request from a host computer operating system.

9. The system of claim 7, wherein the power and performance management agent is capable of adjusting power state for the at least one storage device in response to determining that the storage device does not have outstanding Input/Output (I/O) activity.

10. The system of claim 7, wherein the power state is adjusted based on a power and performance policy.

11. The system of claim 7, wherein the frequency is not adjusted below a predetermined minimum.

12. The system of claim 7, wherein the power and performance management agent is capable of adjusting a power state of at least one additional storage device.

13. An article of manufacture comprising a storage medium having stored therein instructions that when executed by a computing device results in the following:
    receiving a power change notification identifying a power set point;
    adjusting a power state of at least one storage device;
    determining whether the power set point has been reached; and
    adjusting I/O processor frequency in response to determining that the power set point has not been reached.

14. The article of manufacture of claim 13, wherein the power change notification is generated by a storage driver upon receipt of a power request from a host computer operating system.

15. The article of manufacture of claim 13, wherein the instructions when executed further result in the following:
    adjusting the power state for the at least one storage device in response to determining that the storage device does not have outstanding Input/Output (I/O) activity.

16. The article of manufacture of claim 13, wherein the power state is adjusted based on a power and performance policy.

17. The article of manufacture of claim 13, wherein the frequency is not adjusted below a predetermined minimum.

18. The article of manufacture of claim 13, wherein the instructions when executed further result in the following:
    adjusting a power state of at least one additional storage device.

* * * * *